US012759463B2

(12) United States Patent
Park et al.

(10) Patent No.: US 12,759,463 B2
(45) Date of Patent: Oct. 13, 2026

(54) DIGITAL MIRROR MONITORING SYSTEM USING MICROSENSORS

(71) Applicant: GM Global Technology Operations LLC, Detroit, MI (US)

(72) Inventors: Jonglee Park, Novi, MI (US); Manoj Kumar Sharma, Troy, MI (US); Julien P. Mourou, Bloomfield Hills, MI (US); Charles R. Quinn, Pleasant Ridge, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 18/828,280

(22) Filed: Sep. 9, 2024

(65) Prior Publication Data

US 2026/0070487 A1 Mar. 12, 2026

(51) Int. Cl.
*B60R 1/26* (2022.01)
*G06T 7/00* (2017.01)
(Continued)

(52) U.S. Cl.
CPC .............. *B60R 1/26* (2022.01); *G06T 7/0002* (2013.01); *G09G 3/32* (2013.01); *H04N 7/183* (2013.01);
(Continued)

(58) Field of Classification Search
CPC ... B60R 1/26; B60R 2300/10; B60R 2300/20; B60R 2300/8066; G06T 7/0002; G06T 2207/20081; G06T 2207/20084; G06T 2207/30252; G09G 3/32; G09G 2380/10; H04N 7/183; G06V 10/761
See application file for complete search history.

(56) References Cited

U.S. PATENT DOCUMENTS 8,924,071 B2 * 12/2014 Stanek .................. G07C 5/008
701/31.4
2021/0034021 A1 * 2/2021 Wenger .................. G06F 30/27
(Continued)

FOREIGN PATENT DOCUMENTS

DE 102012218320 A1 4/2014
EP 3441963 A1 2/2019

*Primary Examiner* — Benjamin C Lee
*Assistant Examiner* — Emily J Frank
(74) *Attorney, Agent, or Firm* — Vívacqua Crane, PLLC

(57) ABSTRACT

A digital mirror monitoring system includes one or more sensors, the one or more sensors capturing optical information about an environment of the one or more sensors. The system further includes one or more display devices in electronic communication with the one or more sensors and displaying the optical information about the environment of the one or more sensors, and a monitoring system that determines that the one or more display devices are accurately portraying the optical information from the one or more sensors. Upon determining that the one or more display devices are functioning properly, the monitoring system continues to monitor the one or more display devices, and upon determining that the one or more display devices are not functioning properly, the monitoring system generates a notification indicating that one or more of the DMs is not functioning properly and schedules the one or more display devices for service.

13 Claims, 5 Drawing Sheets

(51) Int. Cl.

| | |
|---|---|
| ***G06V 10/74*** | (2022.01) |
| ***G09G 3/32*** | (2016.01) |
| ***H04N 7/18*** | (2006.01) |

(52) U.S. Cl.

CPC ....... *B60R 2300/10* (2013.01); *B60R 2300/20* (2013.01); *B60R 2300/8066* (2013.01); *G06T 2207/20081* (2013.01); *G06T 2207/20084* (2013.01); *G06T 2207/30252* (2013.01); *G06V 10/761* (2022.01); *G09G 2380/10* (2013.01)

(56) References Cited

U.S. PATENT DOCUMENTS

| | | | | |
|---|---|---|---|---|
| 2021/0327371 | A1* | 10/2021 | Blaker | G09G 3/2092 |
| 2022/0068900 | A1* | 3/2022 | Niu | H10W 90/00 |
| 2022/0164582 | A1* | 5/2022 | Raghavan | G06N 3/0895 |
| 2025/0232667 | A1* | 7/2025 | Bai | G08G 1/0116 |

* cited by examiner

DIGITAL MIRROR MONITORING SYSTEM USING MICROSENSORS

INTRODUCTION

The present disclosure relates to mirrors, and more specifically to digital mirrors containing microLED displays used in digital rear-view or digital side-view mirror systems in vehicles. Digital mirrors utilize cameras and display technologies to display exterior views of vehicles for drivers. More specifically, signals from the cameras are sent to digital mirror or electronic mirror (e-mirror) displays which subsequently display image data captured by the cameras.

Digital mirrors or e-mirrors may age, degrade, or otherwise display image data that may be inaccurate for a variety of reasons. Accordingly, digital mirror or e-mirror function is monitored to ascertain whether the digital or e-mirror is operating correctly. Current digital mirror monitoring systems and methods utilize one or more cameras facing the digital mirrors and cross-verifying that the data being displayed on the digital mirrors correlates properly with optical data obtained by digital rear-view and/or digital side-view mirror system cameras.

While current systems and methods for monitoring digital mirror image data accuracy achieve their intended purpose, there is a need for a new and improved system and method for digital mirror monitoring that decrease system complexity, decrease manufacturing complexity, reduce hardware requirements, improve digital mirror accuracy and precision, provide redundancy, and which may be retrofitted to vehicles or provided as original equipment.

SUMMARY

According to several aspects of the present disclosure, a digital mirror (DM) monitoring system includes one or more sensors, the one or more sensors capturing optical information about an environment of the one or more sensors. The system further includes one or more display devices in electronic communication with the one or more sensors and displaying the optical information about the environment of the one or more sensors, and a monitoring system that determines that the one or more display devices are accurately portraying the optical information from the one or more sensors. Upon determining that the one or more display devices are functioning properly, the monitoring system continues to monitor the one or more display devices, and upon determining that the one or more display devices are not functioning properly, the monitoring system generates a notification indicating that one or more of the DMs is not functioning properly and schedules the one or more display devices for service.

In another aspect of the present disclosure, each of the one or more display devices further includes a microLED array having a plurality of microLEDs disposed thereon, and a microsensor array disposed within the microLED array. A quantity of microsensors in the microsensor array is significantly smaller than a quantity of microLEDs in the microLED array. The microsensor array monitors the optical images displayed on the display devices.

In another aspect of the present disclosure the monitoring system further includes one or more controllers, each of the one or more controllers having a processor, a memory, and one or more input/output (I/O) ports. The one or more sensors are in electronic communication with the one or more display devices via the I/O ports. The one or more display devices display the optical information about the environment of the one or more sensors from the sensors. The memory stores programmatic control logic including an algorithm that defines when the display device is properly displaying the optical information captured by the one or more sensors by comparing a source signal from the one or more sensors to a display signal from the microsensor array. The notification is transmitted to a system operator and forwarded to a system manufacturer. In response to receiving the notification, the system manufacturer schedules the one or more display devices for service or causes an over-the-air (OTA) update to be applied to the DM to realign or update the DM to address performance issues identified in the notification.

In another aspect of the present disclosure the algorithm further includes control logic that determines whether the source signal and the display signal are semantically identical by applying the following equation to the source and display signals:

$$MSE(I_A, I_B) = \frac{1}{mn}\sum_{i=0}^{m-1}\sum_{j=0}^{n-1}|I_A(i, j) - I_B(i, j)|^2$$

where $MSE(I_A, I_B)$ is a mean-square error of the source signal ($I_A$), and the display signal from the microsensor array ($I_B$). Semantically identical source and display signals include identical objects within the optical information. Semantically identical source and display signals result in a mean-square error having a value that approaches or is zero.

In another aspect of the present disclosure the algorithm further includes utilizing twin networks with shared weights to compare the source and display signals ($I_A$, $I_B$) in real-time using a contrastive loss function defined as:

$$L = (1 - y) * \|x_i - x_j\|^2 + y * \max(0, m - \|x_i - x_j\|^2)$$

where the contrastive loss function L defines a level of similarity between feature vectors of objects detected within the source and display signals ($I_A$, $I_B$).

In another aspect of the present disclosure the twin networks further include two identical neural networks (NNs) using precisely the same parameters and weights. Training inputs to the network include training pairs of images that have similar contents, and training pairs of images that have dissimilar contents. While training the twin networks, the training pairs of images are passed through the identical NNs and feature vectors are extracted for each image of the training pairs of images and when training pairs of images are similar, the feature vectors are similar. When training pairs of images are not similar, the feature vectors are also not similar.

In another aspect of the present disclosure a collimator is disposed overtop of at least a portion of the microLED array and a portion of the microsensor array. The collimator increases an effectiveness of microsensor light collection from the microLEDs on the display device from a first level to a second level greater than the first level.

In another aspect of the present disclosure the microLED array is disposed on a transparent material, the microsensor array is installed behind the microLED array, relative to an exterior surface of the microLED array, and the microsensors detect light emitted from the microLED array through the transparent material.

In another aspect of the present disclosure the microLED array receives the optical information about the environment of the one or more sensors from the controller via a source driver. The source driver transmits a display command to each individual microLED of the microLED array, and light emitted by the microLEDs of the microLED array is measured by the microsensors, the microsensors transmit microsensor data to a gate driver via gate bus lines and to the vehicle via sensor bus lines.

In another aspect of the present disclosure a digital mirror (DM) monitoring system for a vehicle includes one or more optical sensors disposed on the vehicle, the one or more sensors capturing optical information about vehicle surroundings. The system further includes one or more digital mirrors disposed on the vehicle, the one or more digital mirrors each having a display device with a microLED array for displaying images, and a microsensor array disposed within the microLED array for measuring images displayed by the microLED array. The system further includes one or more controllers, each of the one or more controllers having a processor, a memory, and one or more input/output (I/O) ports, the memory storing programmatic logic including a digital mirror monitoring application (DMM application). The DMM application includes a first control logic that causes the optical sensors to obtain images of the surroundings of the vehicle; and a second control logic causes the optical sensors to send the images of the surroundings of the vehicle to the controller. The images are received by the controller. The DMM application includes a third control logic that causes the controller to transmit a display command to the microLED arrays of the one or more digital mirrors via a source driver, and a fourth control logic that causes the source driver to pass the display command to individual microLEDs in the microLED array. The DMM application further includes a fifth control logic that utilizes the microsensors to monitor light output of the microLEDs, a sixth control logic that ascertains a level of similarity between the optical information captured by the one or more optical sensors and light output image data captured by the microsensors; and a seventh control logic that determines whether the microLED array is operating accurately and in unison with the optical sensor, upon determining that the one or more display devices are functioning properly. The seventh control logic also causes the microsensors to continue to monitor the one or more display devices; and upon determining that the one or more display devices are not functioning properly, the seventh control logic generates a notification and transmits the notification to the vehicle operator, the notification indicating that one or more of the DMs of the vehicle is not functioning properly, the seventh control logic forwarding the notification to a vehicle manufacturer; and causing the vehicle manufacturer to schedule the vehicle for service, causing the vehicle manufacturer to send an over-the-air (OTA) update to realign or otherwise address the DM performance issues identified in the notification.

In another aspect of the present disclosure the sixth control logic further includes control logic that includes an algorithm that defines when the display device is properly displaying the optical information captured by the one or more sensors by comparing a source signal from the one or more sensors to a display signal from the microsensor array. The algorithm further includes control logic that determines whether the source signal and the display signal are semantically identical by applying the following equation to the source and display signals:

$$MSE(I_A, I_B) = \frac{1}{mn}\sum_{i=0}^{m-1}\sum_{j=0}^{n-1}|I_A(i, j) - I_B(i, j)|^2$$

where $MSE(I_A, I_B)$ is a mean-square error of the source signal ($I_A$), and the display signal from the microsensor array ($I_B$). Semantically identical source and display signals include identical objects within the optical information, and semantically identical source and display signals result in a mean-square error having a value that approaches or is zero. The algorithm further utilizes twin networks with shared weights to compare the source and display signals ($I_A$, $I_B$) in real-time using a contrastive loss function defined as:

$$L = (1-y)*\|x_i - x_j\|^2 + y*\max(0, m - \|x_i - x_j\|^2)$$

where the loss function L defines a level of similarity between feature vectors of objects detected within the source and display signals ($I_A$, $I_B$). The twin networks further include two identical neural networks (NNs) using precisely the same parameters and weights. Training inputs to the network include training pairs of images that have similar contents, and training pairs of images that have dissimilar contents. While training the twin networks, the training pairs of images are passed through the identical NNs and feature vectors are extracted for each image of the training pairs of images and when training pairs of images are similar, the feature vectors are similar, and when training pairs of images are not similar, the feature vectors are also not similar.

In another aspect of the present disclosure a collimator is disposed overtop of at least a portion of the microLED array and a portion of the microsensor array. The collimator increases an effectiveness of microsensor light collection from the microLEDs on the display device from a first level to a second level greater than the first level.

In another aspect of the present disclosure the microLED array is disposed on a transparent material, the microsensor array is installed behind the microLED array, relative to an exterior surface of the microLED array, and the microsensors detect light emitted from the microLED array through the transparent material.

In another aspect of the present disclosure the microLED array receives the optical information about the surroundings of the vehicle from the controller via a source driver; the source driver transmits a display command to each individual microLED of the microLED array; and light emitted by the microLEDs of the microLED array is measured by the microsensors, the microsensors transmit microsensor data to a gate driver via gate bus lines and to the vehicle via sensor bus lines.

In another aspect of the present disclosure a method for digital mirror (DM) monitoring in a vehicle includes capturing optical information about the vehicle's surroundings with one or more optical sensors disposed on the vehicle and displaying images on one or more digital mirrors disposed on the vehicle. The one or more digital mirrors each define a display device having a microLED array for displaying the images and a microsensor array disposed within the microLED array for measuring the images displayed on the microLED array. The method further includes executing programmatic control logic stored memory of one or more controllers, each of the one or more controllers having a processor, the memory, and one or more input/output (I/O) ports, the programmatic control logic including a digital mirror monitoring application (DMM application) having control logic for: causing the optical sensors to obtain images of the surroundings of the vehicle, and sending, from the optical sensors to the controller, the images of the surroundings of the vehicle and receiving the images within the controller. The DMM application further includes control logic for transmitting, via the controller, a display command to the microLED arrays of the one or more digital mirrors via a source driver, causing the source driver to pass the display command to individual microLEDs in the microLED array, and monitoring, via the microsensors, light output of the microLEDs. The DMM application further includes control logic for ascertaining a level of similarity between the optical information captured by the one or more optical sensors and light output image data captured by the microsensors, and determining whether the microLED array is operating accurately and in unison with the optical sensor, upon determining that the one or more display devices are functioning properly. The DMM further includes control logic for continuing to monitor, via the microsensors, the display devices; and upon determining that the one or more display devices are not functioning properly, generating a notification and transmitting the notification to the vehicle operator. The notification indicates that one or more of the DMs of the vehicle is not functioning properly. The DMM application further includes control logic for forwarding the notification to a vehicle manufacturer, and for causing the vehicle manufacturer to schedule the vehicle for service, causing the vehicle manufacturer to send an over-the-air (OTA) update to realign or otherwise address the DM performance issues identified in the notification.

In another aspect of the present disclosure the method further includes defining when the display device is properly displaying the optical information captured by the one or more sensors by comparing a source signal from the one or more sensors to a display signal from the microsensor array.

In another aspect of the present disclosure the method further includes determining whether the source signal and the display signal are semantically identical by applying the following equation to the source and display signals:

$$MSE(I_A, I_B) = \frac{1}{mn}\sum_{i=0}^{m-1}\sum_{j=0}^{n-1}|I_A(i, j) - I_B(i, j)|^2$$

where $MSE(I_A, I_B)$ is a mean-square error of the source signal ($I_A$), and the display signal from the microsensor array ($I_B$). Semantically identical source and display signals include identical objects within the optical information, and semantically identical source and display signals result in a mean-square error having a value that approaches or is zero.

In another aspect of the present disclosure the method further includes comparing the source and display signals ($I_A$, $I_B$) in real-time with twin networks having shared weights using a contrastive loss function defined as:

$$L = (1 - y) * \|x_i - x_j\|^2 + y * \max(0, m - \|x_i - x_j\|^2)$$

where the contrastive loss function L defines a level of similarity between feature vectors of objects detected within the source and display signals ($I_A$, $I_B$). The twin networks include: two identical neural networks (NNs) using precisely the same parameters and weights. Training inputs to the network include training pairs of images that have similar contents, and training pairs of images that have dissimilar contents. While training the twin networks, the training pairs of images are passed through the identical NNs and feature vectors are extracted for each image of the training pairs of images and when training pairs of images are similar, the feature vectors are similar, and when training pairs of images are not similar, the feature vectors are also not similar.

In another aspect of the present disclosure the method further includes increasing an effectiveness of microsensor light collection from the microLEDs on the display device from a first level to a second level greater than the first level with a collimator disposed overtop of at least a portion of the microLED array and a portion of the microsensor array.

In another aspect of the present disclosure the method further includes placing the microLED array on a transparent material, installing the microsensor array behind the microLED array, relative to an exterior surface of the microLED array; and detecting, via the microsensors, light emitted from the microLED array through the transparent material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
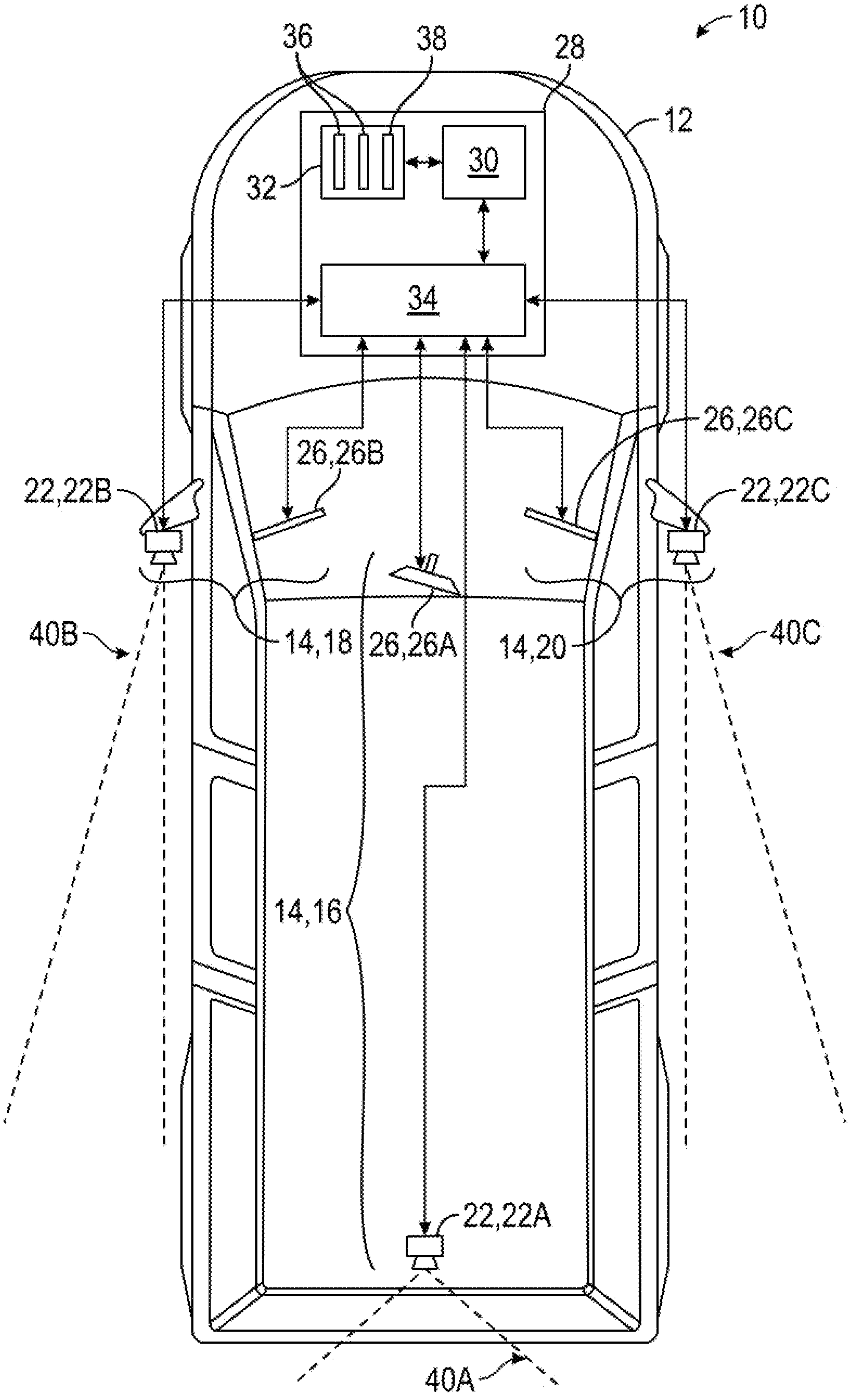
FIG. 1 is a schematic view of a digital mirror monitoring system using microsensors according to an exemplary embodiment.

Referring to FIG. 1, a digital mirror monitoring (DMM) system 10 is shown schematically. The DMM system 10 includes a vehicle 12. It will be appreciated that while the vehicle 12 shown is a sport-utility vehicle (SUV), the vehicle 12 may be of any type of vehicle 12 without departing from the scope or intent of the present disclosure. In several non-limiting examples, the vehicle 12 may be a car, a truck, an SUV, a bus, a bicycle, a motorcycle, a moped, a scooter, a semi-tractor, a tractor used in farming or construction or the like, a watercraft, an aircraft such as a plane or helicopter, or any other type of vehicle 12 equipped with mirrors 14.

In the context of the present disclosure, the terms "forward", "rear", "inner", "inwardly", "outer", "outwardly", "above", and "below" are terms used relative to the orientation of the vehicle 12 as shown in the drawings of the present application. Thus, "forward" refers to a direction toward a front of a vehicle, "rearward" or "behind" refers to a direction toward a rear of the vehicle 12, "inner" and "inwardly" refers to a direction towards the interior of the vehicle 12, and "outer" and "outwardly" refers to a direction towards the exterior of the vehicle 12, "below" refers to a direction towards the bottom of the vehicle 12, and "above" refers to a direction towards a top of the vehicle 12. Additionally, where used, the term "approximately" is known to those skilled in the art, and the term "generally" is known to those skilled in the art.

Mirrors 14 of the vehicle 12 may include, but are in no way limited to internal rear-view mirrors 16, left side view mirror 18 and right side view mirror 20. Each of the internal rear-view mirror 16 and left and right side view mirrors 18, 20 includes one or more optical sensors 22, such as cameras 24, light-detection and ranging (LiDAR) sensors or the like, and a display 26. In some examples, the display 26, the optical sensors 22, and the mirrors 14 are integrally formed with one another, and define a single piece of hardware, however for the sake of brevity and clarity in the description that follows, the display 26 and mirrors the optical sensors 22 are shown in FIG. 1 as being separate or at least separated components. The digital mirrors (DMs) 14, optical sensors 22, and displays 26 are in electronic communication with a controller 28.

The controller 28 is a non-generalized, electronic control device having a preprogrammed digital computer or processor 30, non-transitory computer readable medium or memory 32 used to store data such as control logic, software applications, instructions, computer code, data, lookup tables, etc., and a transceiver or input/output (I/O) ports 34. Computer readable medium or memory 32 includes any type of medium capable of being accessed by a computer, such as read only memory (ROM), random access memory (RAM), a hard disk drive, a compact disc (CD), a digital video disc (DVD), or any other type of memory 32. A "non-transitory" computer readable memory 32 excludes wired, wireless, optical, or other communication links that transport transitory electrical or other signals. A non-transitory computer readable memory 32 includes media where data can be permanently stored and media where data can be stored and later overwritten, such as a rewritable optical disc or an erasable memory device. Computer code includes any type of program code, including source code, object code, and executable code. The processor 30 is configured to execute the code or instructions. In vehicular examples, the controller 28 may be a dedicated Wi-Fi controller, an engine control module, a transmission control module, a body control module, an infotainment control module, a DM 14 control module, or the like. The I/O ports 24 are configured to communicate via wired connections and/or to wirelessly communicate with using Wi-Fi protocols under IEEE 802.11x.

The controller 28 further includes one or more applications 36. An application 36 is a software program configured to perform a specific function or set of functions. The application 36 may include one or more computer programs, software components, sets of instructions, procedures, functions, objects, classes, instances, related data, or a portion thereof adapted for implementation in a suitable computer readable program code. The applications 36 may be stored within the memory 32 or in additional or separate memory 32. Examples of the applications 36 include audio or video streaming services, games, browsers, social media, as well as a DMM application 38.

The DMs 14, including the optical sensors 22 and display devices or displays 26, are in electronic communication with the controller 28, and through the controller 28, the DMs 14, including the optical sensors 22 and displays 26, are in electronic communication with each other. In further examples, the DMs 14, including the optical sensors 22 and displays 26 are in direct communication with one another. The optical sensors 22 each have a distinct field of view 40A, 40B, 40C that encompasses an area surrounding the vehicle 12. Optical sensor 22 data including the visible content of the fields of view 40A, 40B, 40C is obtained by the optical sensors 22, processed, and transmitted via the controller 28 to the relevant displays 26 corresponding to each field of view 40A, 40B, 40C. That is, the interior rear-view mirror 16 display 26A presents an image obtained by an optical sensor 22A with a rear field of view 40A that includes optical information about an area directly behind the vehicle 12. Likewise, the left side view mirror 18 display 26B presents an image obtained by an optical sensor 22B with a left side field of view 40B that includes optical information about an area to the left of the vehicle 12, and the right side view mirror 20 display 26C presents an image obtained by an optical sensor 22C with a right side field of view 40C that includes optical information about an area to the right of the vehicle 12.

Figure 2:
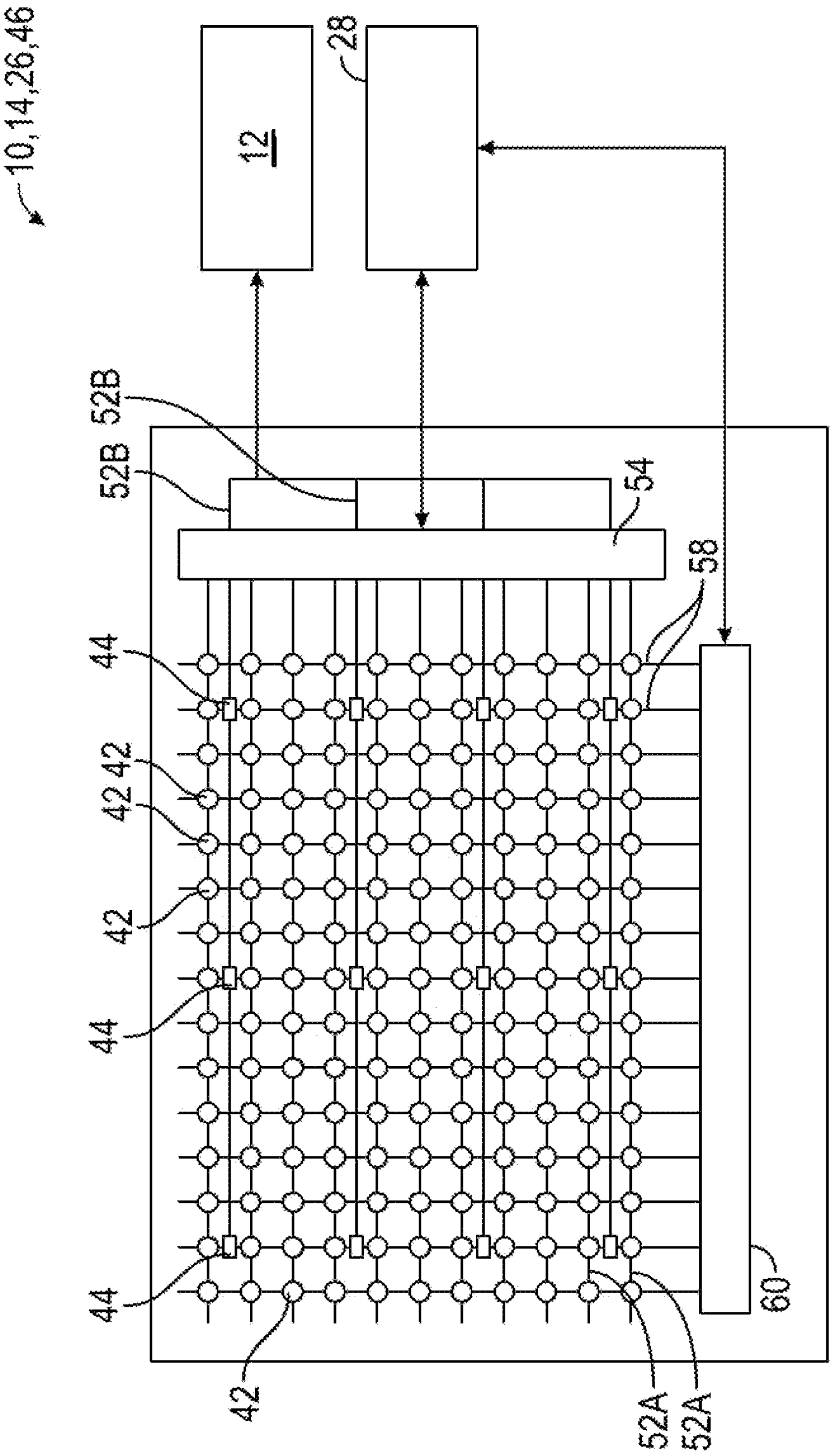
FIG. 2 is a schematic view of a display device of the digital mirror monitoring system using microsensors of FIG. 1 according to an exemplary embodiment.

Turning now to FIG. 2 and with continuing reference to FIG. 1, an exemplary display 26 of an exemplary DM 14 is shown in additional detail in schematic plan view in FIG. 2. The displays 26 of the DMs 14 include light emitting diodes (LEDs), and more specifically an array of microLEDs 42, and a plurality of microsensors 44. In an example, the array of microLEDs 42 and the array of microsensors 44 are installed on a common backplane system 46. As shown in FIG. 2, a quantity of microLEDs 42 within the microLED 42 array of the exemplary display 26 of the exemplary DM 14 is significantly larger than the quantity of microsensors 44 disposed in exemplary display 26 of the exemplary DM 14. In several examples, in a fifty pixel per inch (50 PPI) display 26, up to eighty-six percent (86%) of open spaces between microLEDs 42 are empty, and approximately fourteen percent (14%) of spaces between microLEDs 42 in the microLED 42 array of the exemplary display 26 have microsensors 44 disposed therein. It should be appreciated, however, that the quantity and ratio of quantities of microsensors 44 to microLEDs 42 in the exemplary display 26 of the exemplary DM 14 may vary substantially without departing from the scope or intent of the present disclosure. Additionally, it should be appreciated that while the description herein relates primarily to microLED 42 displays 26, that other types of displays 26, including but not limited to: OLED, QLED, COB LED, GOB LED, DIP LED, and flexible LED displays, or the like may be used without departing from the scope or intent of the present disclosure. The microsensor 44 array detects light from the microLEDs 42 to monitor images displayed on the display 26. Both signals from the optical sensors 42 to detect vehicle 12 surroundings or an environment of the vehicle 12 and the microsensor 44 array are sent to a vehicle 12 monitoring system, where the vehicle monitoring system defines whether the images being displayed on the display 26 is an accurate and correct representation of the vehicle's 12 surroundings, and an accurate and correct representation of the image data obtained by the optical sensors 22.

Figures 3A, 3B, 3C:
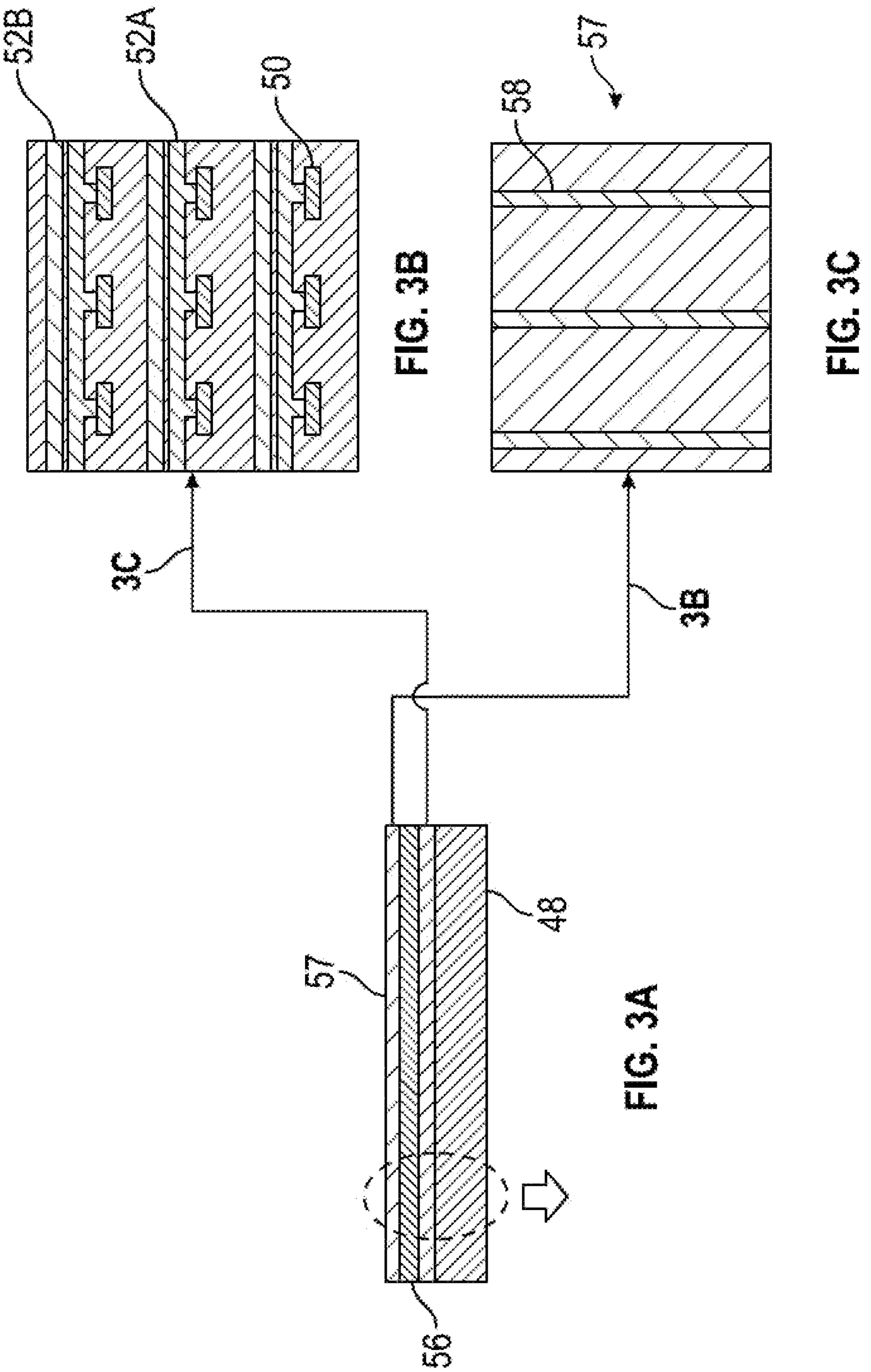
FIG. 3A is a partial cross-sectional view of the display device of FIG. 2, depicting a plurality of layers of the digital mirror monitoring system using microsensors according to an exemplary embodiment.
FIG. 3B is a partial plan view of the display device of FIG. 3A, depicting a plurality of sensor and gate bus lines of the digital mirror monitoring system using microsensors according to an exemplary embodiment.
FIG. 3C is a partial plan view of the display device of FIG. 3A, depicting a plurality of source bus lines of the digital mirror monitoring system using microsensors according to an exemplary embodiment.

Turning now to FIGS. 3A, 3B, 3C, 3D and 3E and with continuing reference to FIGS. 1 and 2, the common backplane system 46 is shown in further detail. The common backplane system 46 of an exemplary DM 14 is shown in FIG. 3A in a partial cross-sectional view, including a plurality of layers disposed overtop one another. The first layer is a substrate 48. The substrate 48 may be any of a variety of substrates used in microcontrollers or the like, such as ceramic materials, aluminum with a dielectric layer, Alumina, Aluminium nitride, Silicon nitride, HPS, Beryllium oxide, or any other such substrate 48 having appropriate thermal conductivity and thermal expansion properties. A second layer 51, disposed overtop and in contact with the substrate 48, includes a plurality of transistors 50 electrically connected to horizontal bus lines 52 shown in additional detail in a partial plan view in FIG. 3B. More specifically, the horizontal bus lines 52 include at least gate bus lines 52A electronically connected to the microLEDs 42 and sensor bus lines 52B electrically connected to the microsensors 44. The gate bus lines 52A are electronically connected to a gate driver 54 and via the gate driver 54 to the controller 28. The controller 28 receives image data from the optical sensors 22 of the vehicle 12 and transmits a display command to the gate driver 54 which processes the display command and causes the microLEDs 42 to display a depiction of the image data from the optical sensors 22 for each relevant DM 14. The sensor bus lines 52B, by contrast, receive data from the microsensors 44 and transmit the microsensor 44 data to the vehicle 12, and more specifically to the DMM application 38. The transistors 50 are in electronic communication with at least the gate bus lines 52A and the microLEDs 42 to control the display of information on the display 26 of the DM 14.

A third layer is disposed overtop the second layer and defines an insulator layer 56. The insulator layer 56 electronically isolates the horizontal bus lines 52 from the fourth layer 57. The fourth layer 57 is shown in additional detail in a partial plan view in FIG. 3C and includes a plurality of vertical source bus lines 58. In a non-limiting example, the vertical source bus lines 58 are oriented orthogonally to the horizontal bus lines 52 of the second layer. The vertical source bus lines 58 carry source data to a source driver 60 which then electronically transmits the source data from the optical sensors 22 of the DMs 14 to the controller 28, where the controller 28 processes the source data and generates a display command via the gate driver 54 to the microLED 42 array.

Figure 3D:
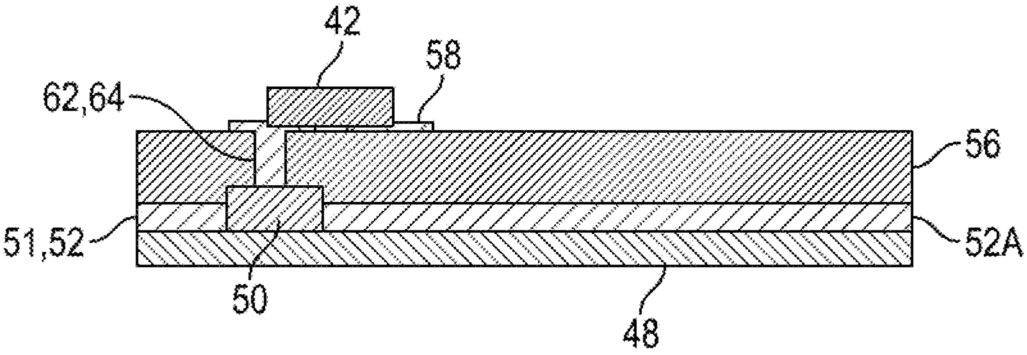
FIG. 3D is a partial cross-sectional view of the display device of FIG. 3A, depicting a microLED disposed in electrical communication with a source bus line and a transistor of the digital mirror monitoring system using microsensors according to an exemplary embodiment.
Figure 3E:
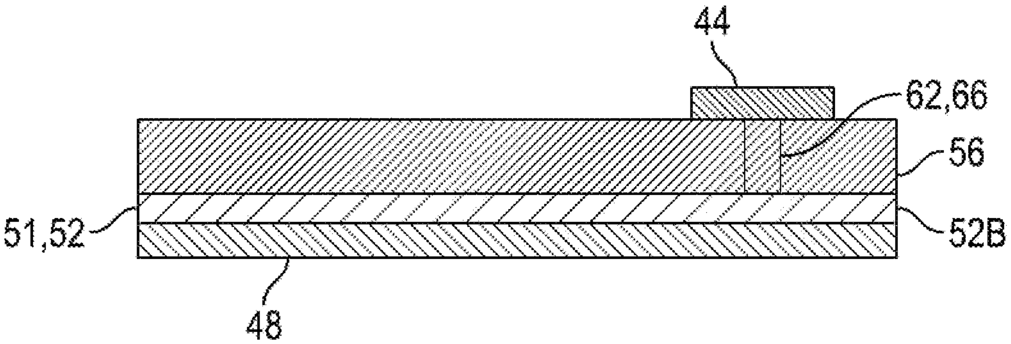
FIG. 3E is a partial cross-sectional view of the display device of FIG. 3A, depicting a microsensor disposed in electrical communication with a sensor bus line of the digital mirror monitoring system using microsensors according to an exemplary embodiment.

FIGS. 3D and 3E include two partial cross-sectional views of the common backplane system 46 depicted in FIG. 3A, and specifically depicts the microLEDs 42 and microsensors 44 in further detail. The microLEDs 42 and microsensors 44 are electronically connected to the gate bus lines 52A and sensor bus lines 52B respectively by traces that extend through orifices 62 formed through the insulator layer 56. In several aspects, microLED traces 64 extend through the orifices 62 in the insulator layer 56 to electronically connect the microLEDs 42 with the transistors 50 and thereby the gate bus lines 52A. Similarly, the microsensor traces 66 extend through the orifices in the insulator layer 56 to electronically connect the microsensors 44 to the sensor bus lines 52B.

Figure 3F:
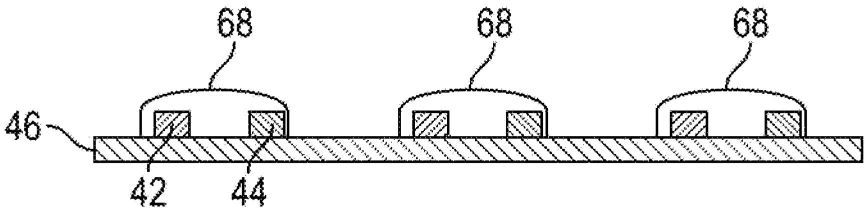
FIG. 3F is a partial cross-sectional view of the display device of FIG. 3A, depicting collimators of the digital mirror monitoring system using microsensors according to an additional exemplary embodiment.
Figure 3G:
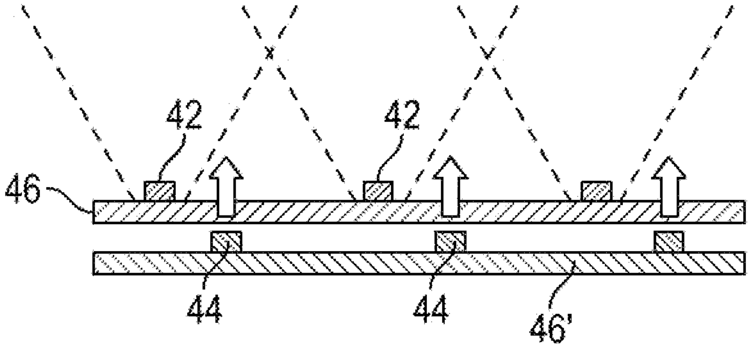
FIG. 3G is a partial cross-sectional view of the display device of FIG. 3A, depicting a first transparent backplane and a second backplane of the digital mirror monitoring system using microsensors according to a second additional exemplary embodiment.

Turning now to FIGS. 3F and 3G, and with continuing reference to FIGS. 1, 2, and 3A-3E, two additional partial cross-sectional views of the common backplane system 46 are shown in additional detail. In some non-limiting examples, the microLEDs 42 and microsensors 44 are located as indicated in FIGS. 3A-3E on a top surface of the insulator layer 56. One or more collimators 68 are used to improve the ability of microsensors 44 of the DM 14 to accurately detect the light being emitted by the microLEDs 42. That is, the collimators 68 focus light from the microLEDs 42 onto the microsensors 44 so that the microsensors 44 can accurately and precisely measure the image being displayed by the microLEDs 42. That is, the collimators 68 increase an ability of the microsensors 44 to collect light from the microLEDs 42 on the display 26 from a first level to a second level greater than the first level.

In the additional non-limiting example shown in FIG. 3G, the microsensors 44 may be disposed on a separate backplane system 46' from the backplane system 46 to which the microLEDs 42 are affixed. In instances where the microsensors 44 are disposed on the separate backplane system 46' located behind the backplane system 46 to which the microLEDs 42 are affixed, the backplane system 46 is made of a transparent material. That is, because the microLEDs 42 are disposed on an opposite side of the backplane system 46 relative to the microsensors 44 in the configuration shown in FIG. 3G, in order for the microsensors 44 to detect light emitted by the microLEDs 42, the backplane system 46 to which the microLEDs 42 are attached must be transparent, or at least translucent. While the configurations shown in FIGS. 3F and 3G may be used, it should be appreciated that these are merely alternative embodiments which may have certain advantages and/or disadvantages relative to the embodiment depicted in FIGS. 3A-3E. Specifically, the collimators 68 provide the embodiment of FIG. 3F with some potential for high precision measurements of DM 14 image accuracy and precision relative to optical sensor 22 input data. The embodiment of FIG. 3G may simplify manufacturing by allowing for separate backplane systems 46, 46' to be produced and then assembled together rather than requiring multiple different electronic components on different layers of a single backplane system 46.

Figure 4:
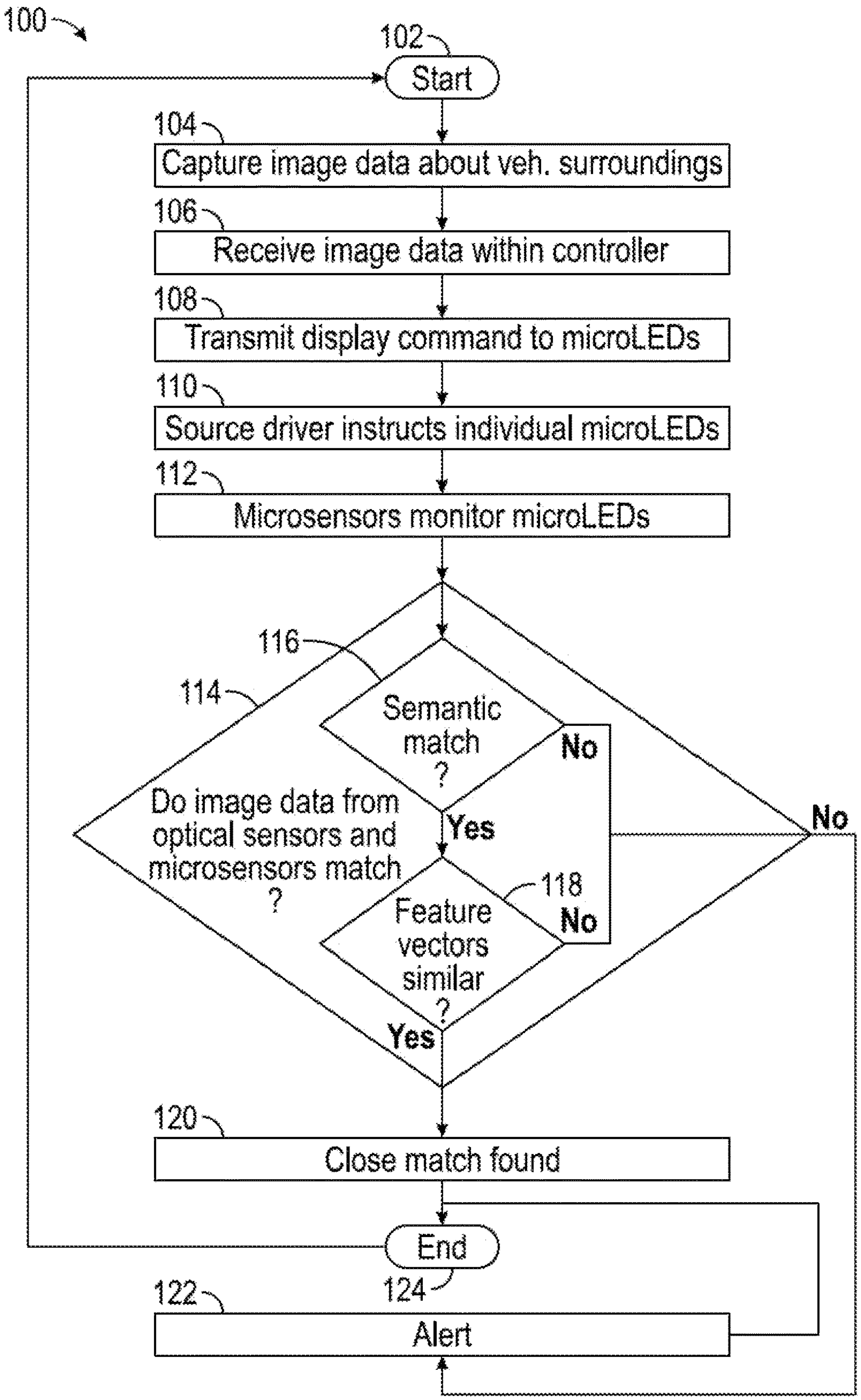
FIG. 4 is a flowchart depicting a method of digital mirror monitoring using microsensors according to an exemplary embodiment.

Turning now to FIG. 4 and with continuing reference to FIGS. 1-3D a series of control logic steps making up the DMM application 38 is shown in further detail as a method 100 in flowchart form. The DMM application 38 includes control logics, or subroutines that check and correct display 26 functionality and informs vehicle 12 operators when the display 26 of one or more of the vehicle's 12 DMs 14 is not functioning within predefined threshold parameters, such as functioning within ASIL-C specifications, or the like. The method 100 begins at block 102. At block 104 a first control logic of the DMM application 38 causes the optical sensors 22 of the system 10 to obtain sensor data including images of the surroundings of the vehicle 12. At block 106, within a second control logic of the DMM application 38, optical sensor 22 data is received, via the I/O ports 34 of the controller 28. At block 108, the controller 28 executes a third control logic of the DMM application 38 that causes the controller 28 to transmit, via the I/O ports 34, a display command to the microLEDs 42 via the source driver 60. In some examples, the controller 28 may execute additional control logics or subroutines of the DMM application 38 to pre-process the optical sensor 22 data to format the optical sensor 22 data so that it can be properly and accurately displayed on the DM 14 to which the optical sensor 22 data is being transmitted. That is, the microLED 42 array of each of the DMs 14 of the vehicle 12 has dimensions, image resolution values, and the like that may not exactly match the resolution of the optical sensor 22 data. Accordingly, the optical sensor 22 data may be processed by the controller 28 to adapt, compress, or otherwise modify or format the optical sensor 22 data to match the hardware available at the DM 14 upon which the data is to be displayed.

At block 110, the controller 28 executes a fourth control logic of the DMM application 38 that causes the source driver 60 to receive the display command from the controller 28 and pass the display command to the individual microLEDs 42 in the microLED 42 array of the DM 14. At block 112, as the microLEDs 42 display the optical sensor 22 data, the controller 28 causes executes a fifth control logic of the DMM application 38 that causes the microsensors 44 monitor light output of the microLEDs 42 in the microLED 42 array of the DM 14, and to report light output readings to the controller 28 and to the vehicle 12 via the gate driver 54. More specifically, at block 112, the microsensors 44 regularly read out image data displayed on the display 26 and transmit the readings to the controller 28. At block 114, the controller 28 executes a fifth control logic of the DMM application 38 including a real-time image matching algorithm that compares and matches the image data captured by the optical sensors 22 of the DM 14 to image data captured by the microsensors 44 of the displays 26. Within the real-time image matching algorithm of the fifth control logic at block 116, images are considered similar when the content of the images differs only in terms of contrast, brightness and rotation, or when the images are semantically identical, meaning that the images depict the same objects. In an example, the DMM application 38 determines whether the images are semantically identical by applying the following equation to the two images:

$$MSE(I_A, I_B) = \frac{1}{mn}\sum_{i=0}^{m-1}\sum_{j=0}^{n-1}|I_A(i, j) - I_B(i, j)|^2$$

where $MSE(I_A, I_B)$ is the mean-square error of the image data captured by the optical sensors 22 ($I_A$), and the image data captured by the microsensors 44 ($I_B$). At block 118, twin networks with shared weights compare the two images ($I_A$, $I_B$) in real-time. Twin networks are neural networks (NNs) that consist of two identical subnetworks that utilize precisely the same parameters and weights. Each subnetwork may be any variety of neural network used for images, including but not limited to: convolutional neural networks (CNNs), deep neural networks (DNNs), or the like. Inputs to train the twin neural network include: pairs of images that are similar (a positive example) and pairs of images that are not similar (a negative example). During training, the training pairs of images are passed through the subnetworks and feature vectors are extracted as outputs. More specifically the twin network outputs two distinct feature vectors, one relating to each of the training input images. When the pairs of input images are similar (positive example), the feature vectors are also similar, while the converse is true when input images are not similar (negative example). Additionally at block 118, the controller 28 executes a sixth control logic of the DMM application 38 that ascertains a level of similarity between feature vectors using a contrastive loss function defined as:

$$L = (1-y) * \|x_i - x_j\|^2 + y * \max\left(0, m - \|x_i - x_j\|^2\right)$$

At block 120, when within the sixth control logic, a close match between the image data from the optical sensors 22 and the image data captured by the microsensors 44 is identified, the controller 28 executes a seventh control logic of the DMM application 38 that determines the microLED 42 display 26 is operating accurately and in unison with the relevant digital mirror 14 optical sensor 22. However, when a difference exceeding a predetermined threshold variance between the optical sensor 22 image data and the microsensor 44 data is identified, the DMM application 38 proceeds to block 122 where the DMM application 38 triggers an alert to the vehicle 12 and to the vehicle 12 operator. In a particular non-limiting example, the image data captured by the microsensors 44 is first transformed to the same resolution and magnification as the data captured by the optical sensors 22. The image data captured by the microsensors 44 and the optical sensors 22 is then compared, and differences greater than approximately ten percent (10%) may trigger a warning, or an alert. In additional non-limiting examples, when the difference between the optical sensor 22 image data and the microsensor 44 data exceeds approximately eight percent (i.e. the optical sensor 22 image data and the microsensor 44 data are 92% similar), the DMM application 38 determines that the difference has exceeded the predetermined threshold variance. In order to ensure that any warnings are accurate, the system 10 executes the comparison of image data from the microsensors 44 and image data from the optical sensors 22 multiple times before determining that a warning or alert is necessary. In a non-limiting example, when the comparison of image data from the microsensors 44 and optical sensors 22 yields an above-threshold result at least ten times, then the system 10 concludes that a problem exists, and generates the warning or alert. In some examples, the alert may be an audio, visual, audiovisual, and/or haptic alert that notifies a vehicle 12 operator of a potential DM 14 hardware issue or failure. In other examples, the alert may be forwarded to a vehicle 12 manufacturer, and the vehicle 12 manufacturer, utilizing the alert, may schedule the vehicle 12 for service, send an over-the-air (OTA) update to realign or otherwise address the DM 14 performance issues identified in the alert, or take other such action. At block 124, the method 100 ends and returns to block 104 where the method 100 runs continuously, periodically, and/or upon the occurrence of a particular trigger condition.

A system 10 and method 100 for monitoring digital mirrors (DMs) 14 with microsensors 44 of the present disclosure offers several advantages. These include decreasing system 10 complexity, decreasing manufacturing complexity, reducing hardware requirements, improving digital mirror 14 accuracy and precision, and providing system 10 redundancy and adaptability. In additional aspects, the system 10 and method 100 of the present disclosure removes the need for an additional camera 24 to monitor images displayed on each digital mirror 14 by integrating a display device 26 monitoring system into the digital mirrors 14 themselves using the microsensor 44 array. MicroLEDs 42 and microsensors 44 are installed on a common backplane 46 which decreases component complexity and allows the system 10 and method 100 to be retrofittable to vehicles 12 or provided as original equipment. Additionally, because the system 10 and method 100 operate in real-time, the system 10 and method 100 can constantly, periodically, and/or continuously adapt to vehicle 12 vibration, solar distortions, visual auras, mirages, and the like, thereby improving the accuracy and confidence of the images depicted on the digital mirrors 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A digital mirror (DM) monitoring system, the system comprising:

one or more sensors, the one or more sensors capturing optical information about an environment of the one or more sensors;

one or more display devices in electronic communication with the one or more sensors and displaying the optical information about the environment of the one or more sensors, wherein each of the one or more display devices further comprises:

a microLED array having a plurality of microLEDs disposed thereon; and a microsensor array disposed within the microLED array, wherein a quantity of microsensors in the microsensor array is significantly smaller than a quantity of microLEDs in the microLED array; and wherein the microsensor array monitors the optical information displayed on the display devices; and a monitoring system that determines that the one or more display devices are accurately portraying the optical information from the one or more sensors, and upon determining that the one or more display devices are functioning properly, the monitoring system continues to monitor the one or more display devices, the monitoring system further comprising:

one or more controllers, each of the one or more controllers having a processor, a memory, and one or more input/output (I/O) ports;

the one or more sensors are in electronic communication with the one or more display devices via the I/O ports;

the one or more display devices displaying the optical information about the environment of the one or more sensors from the sensors;

the memory storing programmatic control logic including an algorithm that defines when the display device is properly displaying the optical information captured by the one or more sensors by comparing a source signal from the one or more sensors to a display signal from the microsensor array, wherein the algorithm further comprises:

control logic that determines whether the source signal and the display signal are semantically identical by applying the following equation to the source and display signals:

$$MSE(I_A, I_B) = \frac{1}{mn}\sum_{i=0}^{m-1}\sum_{j=0}^{n-1}|I_A(i, j) - I_B(i, j)|^2$$

where $MSE(I_A, I_B)$ is a mean-square error of the source signal ($I_A$), and the display signal from the microsensor array ($I_B$), wherein semantically identical source and display signals include identical objects within the optical information, and wherein semantically identical source and display signals result in a mean-square error having a value that approaches or is zero, wherein the algorithm further comprises:

utilizing twin networks with shared weights to compare the source and display signals ($I_A$, $I_B$) in real-time using a contrastive loss function L defined as:

$$L = (1 - y) * \|x_i - x_j\|^2 + y * \max(0, m - \|x_i - x_j\|^2)$$

where the contrastive loss function L defines a level of similarity between feature vectors of objects detected within the source and display signals ($I_A$, $I_B$); and a notification is transmitted to a system operator and forwarded to a system manufacturer, wherein in response to receiving the notification, the system manufacturer schedules the one or more display devices for service or causes an over-the-air (OTA) update to be applied to the DM to realign or update the DM to address performance issues identified in the notification; and upon determining that the one or more display devices are not functioning properly, the monitoring system generates a notification indicating that one or more DMs of the system is not functioning properly and schedules the one or more display devices for service.

2. The system of claim 1, wherein the twin networks further comprise:

two identical neural networks (NNs) using precisely the same parameters and weights, wherein training inputs to the network include training pairs of images that have similar contents, and training pairs of images that have dissimilar contents, wherein while training the twin networks, the training pairs of images are passed through the identical NNs and feature vectors are extracted for each image of the training pairs of images and when training pairs of images are similar, the feature vectors are similar, and wherein when training pairs of images are not similar, the feature vectors are also not similar.

3. The system of claim 1, wherein a collimator is disposed overtop of at least a portion of the microLED array and a portion of the microsensor array, wherein the collimator increases an effectiveness of microsensor light collection from the microLEDs on the display device from a first level to a second level greater than the first level.

4. The system of claim 1, wherein the microLED array is disposed on a transparent material, the microsensor array is installed behind the microLED array, relative to an exterior surface of the microLED array, and wherein the microsensors detect light emitted from the microLED array through the transparent material.

5. The system of claim 1, wherein the microLED array receives the optical information about the environment of the one or more sensors from one or more controllers via a source driver;

the source driver transmits a display command to each individual microLED of the microLED array; and light emitted by the microLEDs of the microLED array is measured by the microsensors, the microsensors transmit microsensor data to a gate driver via gate bus lines and to a vehicle via sensor bus lines.

6. A digital mirror (DM) monitoring system for a vehicle, the system comprising:

one or more optical sensors disposed on the vehicle, the one or more sensors capturing optical information about vehicle surroundings;

one or more digital mirrors disposed on the vehicle, the one or more digital mirrors each having a display device with a microLED array for displaying images, and a microsensor array disposed within the microLED array for measuring images displayed by the microLED array, wherein each of the one or more digital mirrors further comprises:

a microLED array having a plurality of microLEDs disposed thereon; and a microsensor array disposed within the microLED array, wherein a quantity of microsensors in the microsensor array is significantly smaller than a quantity of microLEDs in the microLED array; and wherein the microsensor array monitors the optical information displayed on the one or more digital mirrors;

one or more controllers, each of the one or more controllers having a processor, a memory, and one or more input/output (I/O) ports, the memory storing programmatic logic including a digital mirror monitoring application (DMM application), the DMM application comprising:

a first control logic that causes the optical sensors to obtain images of the surroundings of the vehicle;

a second control logic causes the optical sensors to send the images of the surroundings of the vehicle to the controller, wherein the images are received by the controller;

a third control logic that causes the controller to transmit a display command to the microLED arrays of the one or more digital mirrors via a source driver;

a fourth control logic that causes the source driver to pass the display command to individual microLEDs in the microLED array;

a fifth control logic that utilizes the microsensors to monitor light output of the microLEDs;

a sixth control logic that ascertains a level of similarity between the optical information captured by the one or more optical sensors and light output image data captured by the microsensors, including:

control logic that includes an algorithm that defines when the display device is properly displaying the optical information captured by the one or more sensors by comparing a source signal from the one or more sensors to a display signal from the microsensor array, wherein the algorithm further comprises:

control logic that determines whether the source signal and the display signal are semantically identical by applying the following equation to the source and display signals:

$$MSE(I_A, I_B) = \frac{1}{mn}\sum_{i=0}^{m-1}\sum_{j=0}^{n-1}|I_A(i, j) - I_B(i, j)|^2$$

where $MSE(I_A, I_B)$ is a mean-square error of the source signal ($I_A$), and the display signal from the microsensor array ($I_B$), wherein semantically identical source and display signals include identical objects within the optical information, and wherein semantically identical source and display signals result in a mean-square error having a value that approaches or is zero;

utilizing twin networks with shared weights to compare the source and display signals ($I_A$, $I_B$) in real-time using a contrastive loss function L defined as:

$$L = (1 - y) * \|x_i - x_j\|^2 + y * \max\left(0, m - \|x_i - x_j\|^2\right)$$

where the contrastive loss function L defines a level of similarity between feature vectors of objects detected within the source and display signals ($I_A$, $I_B$); and wherein the twin networks further comprise:

two identical neural networks (NNs) using precisely the same parameters and weights, wherein training inputs to the network include training pairs of images that have similar contents, and training pairs of images that have dissimilar contents, wherein while training the twin networks, the training pairs of images are passed through the identical NNs and feature vectors are extracted for each image of the training pairs of images and when training pairs of images are similar, the feature vectors are similar, and wherein when training pairs of images are not similar, the feature vectors are also not similar; and a seventh control logic that determines whether the microLED array is operating accurately and in unison with the optical sensor, upon determining that the one or more display devices are functioning properly, the seventh control logic causes the microsensors to continue to monitor the one or more display devices; and upon determining that the one or more display devices are not functioning properly, the seventh control logic generates a notification and transmits the notification to a vehicle operator, the notification indicating that one or more DMs of the vehicle is not functioning properly, the seventh control logic forwarding the notification to a vehicle manufacturer; and causing the vehicle manufacturer to schedule the vehicle for service, causing the vehicle manufacturer to send an over-the-air (OTA) update to realign or otherwise address DM performance issues identified in the notification.

7. The system of claim 6, wherein a collimator is disposed overtop of at least a portion of the microLED array and a portion of the microsensor array, wherein the collimator increases an effectiveness of microsensor light collection from the microLEDs on the display device from a first level to a second level greater than the first level.

8. The system of claim 6, wherein the microLED array is disposed on a transparent material, the microsensor array is installed behind the microLED array, relative to an exterior surface of the microLED array, and wherein the microsensors detect light emitted from the microLED array through the transparent material.

9. The system of claim 6, wherein the microLED array receives the optical information about the surroundings of the vehicle from the controller via a source driver;

the source driver transmits a display command to each individual microLED of the microLED array; and light emitted by the microLEDs of the microLED array is measured by the microsensors, the microsensors transmit microsensor data to a gate driver via gate bus lines and to the vehicle via sensor bus lines.

10. A method for digital mirror (DM) monitoring in a vehicle, the method comprising:

capturing optical information about the vehicle's surroundings with one or more optical sensors disposed on the vehicle;

displaying images on one or more digital mirrors disposed on the vehicle, the one or more digital mirrors each defining a display device having a microLED array for displaying the images and a microsensor array disposed within the microLED array for measuring the images displayed on the microLED array, wherein each of the one or more display devices further comprises:

a microLED array having a plurality of microLEDs disposed thereon; and a microsensor array disposed within the microLED array, wherein a quantity of microsensors in the microsensor array is significantly smaller than a quantity of microLEDs in the microLED array; and wherein the microsensor array monitors the optical information displayed on the display devices;

executing programmatic control logic stored memory of one or more controllers, each of the one or more controllers having a processor, the memory, and one or more input/output (I/O) ports, the programmatic control logic including a digital mirror monitoring application (DMM application) comprising control logic for:

causing the optical sensors to obtain images of the surroundings of the vehicle;

sending, from the optical sensors to the controller, the images of the surroundings of the vehicle and receiving the images within the controller;

transmitting, via the controller, a display command to the microLED arrays of the one or more digital mirrors via a source driver;

causing the source driver to pass the display command to individual microLEDs in the microLED array;

monitoring, via the microsensors, light output of the microLEDs;

ascertaining a level of similarity between the optical information captured by the one or more optical sensors and light output image data captured by the microsensors; and determining whether the microLED array is operating accurately and in unison with the optical sensor, upon determining that the one or more display devices are functioning properly, including:

determining whether the source signal and the display signal are semantically identical by applying the following equation to the source and display signals:

$$MSE(I_A, I_B) = \frac{1}{mn}\sum_{i=0}^{m-1}\sum_{j=0}^{n-1} |I_A(i, j) - I_B(i, j)|^2$$

where $MSE(I_A, I_B)$ is a mean-square error of the source signal ($I_A$), and the display signal from the microsensor array ($I_B$), wherein semantically identical source and display signals include identical objects within the optical information, and wherein semantically identical source and display signals result in a mean-square error having a value that approaches or is zero;

comparing the source and display signals ($I_A$, $I_B$) in real-time with twin networks having shared weights using a contrastive loss function L defined as:

$$L = (1 - y) * \|x_i - x_j\|^2 + y * \max\left(0, m - \|x_i - x_j\|^2\right)$$

where the contrastive loss function L defines a level of similarity between feature vectors of objects detected within the source and display signals ($I_A$, $I_B$), wherein the twin networks comprise:

two identical neural networks (NNs) using precisely the same parameters and weights, wherein training inputs to the network include training pairs of images that have similar contents, and training pairs of images that have dissimilar contents, wherein while training the twin networks, the training pairs of images are passed through the identical NNs and feature vectors are extracted for each image of the training pairs of images and when training pairs of images are similar, the feature vectors are similar, and wherein when training pairs of images are not similar, the feature vectors are also not similar;

continuing to monitor, via the microsensors, the display devices; and upon determining that the one or more display devices are not functioning properly, generating a notification and transmitting the notification to a vehicle operator, wherein the notification indicates that one or more DMs of the vehicle is not functioning properly;

forwarding the notification to a vehicle manufacturer; and causing the vehicle manufacturer to schedule the vehicle for service, causing the vehicle manufacturer to send an over-the-air (OTA) update to realign or otherwise address DM performance issues identified in the notification.

11. The method of claim 10, further comprising:

defining when the display device is properly displaying the optical information captured by the one or more sensors by comparing a source signal from the one or more sensors to a display signal from the microsensor array.

12. The method of claim 10, further comprising:

increasing an effectiveness of microsensor light collection from the microLEDs on the display device from a first level to a second level greater than the first level with a collimator disposed overtop of at least a portion of the microLED array and a portion of the microsensor array.

13. The method of claim 10, further comprising:

placing the microLED array on a transparent material;

installing the microsensor array behind the microLED array, relative to an exterior surface of the microLED array; and detecting, via the microsensors, light emitted from the microLED array through the transparent material.

* * * * *